Patented May 31, 1932

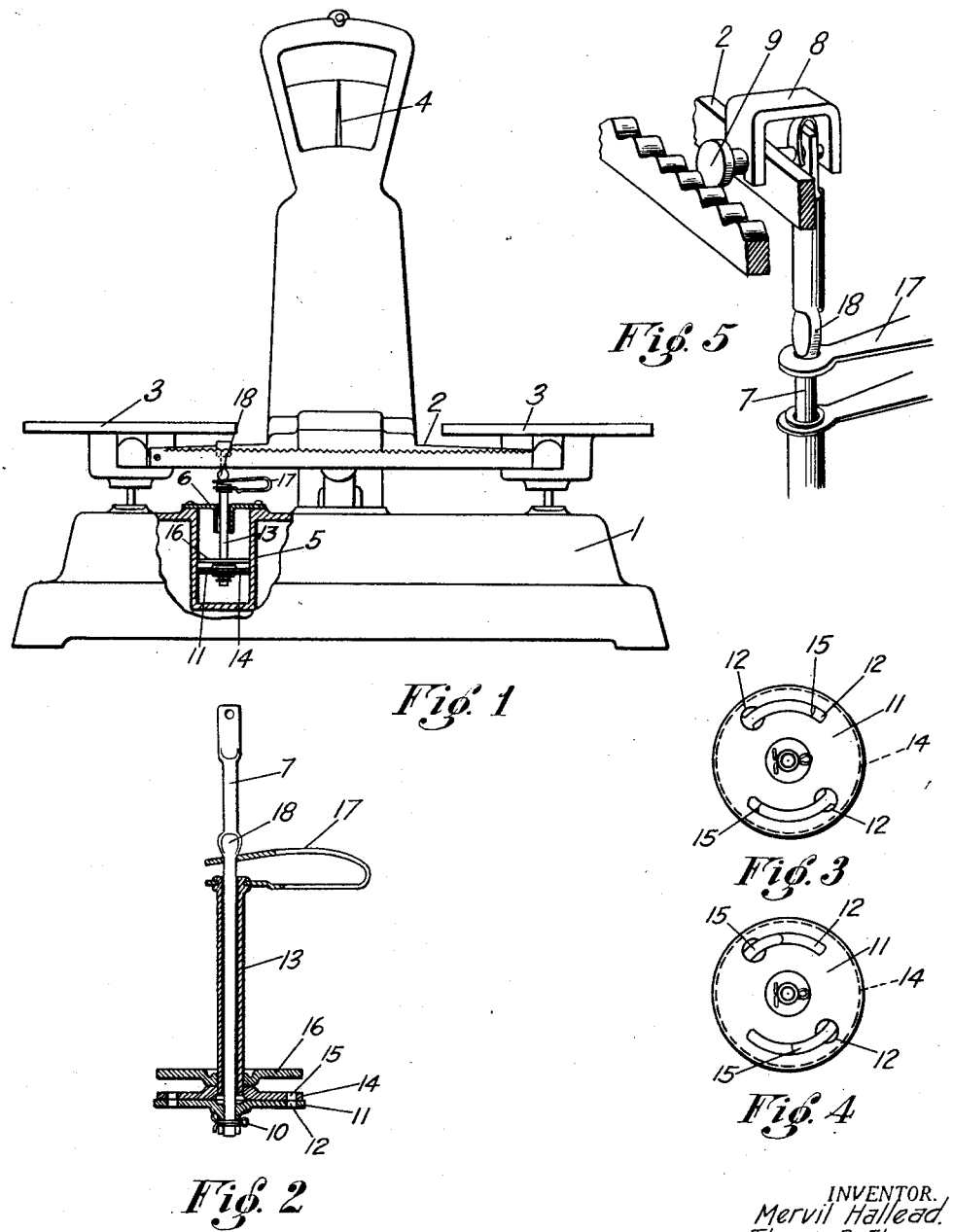

1,861,270

UNITED STATES PATENT OFFICE

MERVIL HALLEAD AND THOMAS B. FLANAGAN, OF COLUMBUS, OHIO, ASSIGNORS TO THE EXACT WEIGHT SCALE COMPANY, OF COLUMBUS, OHIO, A CORPORATION OF OHIO

DASHPOT FOR WEIGHING SCALES

Application filed April 17, 1928. Serial No. 270,752.

Our invention relates to weighing scales. It has particular reference to that part of the scale commonly called the "dash pot" which serves the purpose of preventing sudden shocks to the scale parts usually resulting from a weight being placed on the scale pan and for minimizing the oscillation and vibration of the scale beam and parts after they have been set in motion.

Heretofore, the dash pots, as applied to scales, have usually consisted of a piston loosely fitting within a cylinder which was partially filled with a liquid, preferably oil. In operation, as the piston was moved upwardly and downwardly by the upward and downward movement of some part of the scale, the liquid within the cylinder would be forced past the piston in one direction or the other, depending upon which direction the piston was moved. In some instances, the body of the piston has been perforated and the liquid has flowed through the perforations in the piston instead of between the outer edge of the piston and the internal wall of the cylinder and a disc adapted to be moved toward and away from the openings by means of threads on the piston rod has been provided. Such disc permitted the rate of flow of the liquid from one side of the piston to the other to be varied.

Such dash pots have not been entirely satisfactory for the reason that, in the first instance, no means were provided for varying the amount of liquid which may pass from one side of the piston to the other in a given length of time under various weighing conditions and, in the second instance, the disc was usually susceptible to being moved up or down on the piston rod by the vibration of the scale parts to vary the effect of the dash pot when it was not desired.

One object of our invention is to provide a dash pot having means of adjustment to compensate for the variations in effect on the scale of the different weights placed on the scale pane as regards shocks to the scale beam and parts.

Another object of our invention is to provide a dash pot wherein means is provided for adjusting the resisting effect of the dash pot with respect to the oscillation and vibration of the scale beam and parts.

Still another object of our invention is to provide a dash pot wherein the possibility of the dash pot becoming out of adjustment as a result of the oscillation and vibration of the scale parts is reduced to a minimum.

A further object of our invention is to provide a means for adjusting the rate of flow of fluid from one side of a dash pot piston to the other which embodies apparatus that will enable the operator to determine the point of adjustment through visibility.

To accomplish the objects of our invention we provide a piston comprising two annular plates having complemental openings therethrough and provide means whereby one of these plates, while being held in cooperative relation with the other, may be rotated relative to the other to vary the size of the opening through such plate and thereby vary the rate of flow of the fluid from one side of the piston to the other. The piston is preferably so constructed that the rotation of one plate relative to the other through an arc of 120 degrees will completely open or close the opening through the plates.

Other and further objects of our invention may be seen in the following description and the preferred embodiment of our invention may be seen in the accompanying drawings wherein similar characters of reference designate corresponding parts and wherein:

Figure 1 is a side view of a scale with parts broken away to show the preferred embodiment of our invention.

Figure 2 is a side view, partly in section, of a preferred form of piston which we employ.

Figure 3 is a view of the bottom of the piston showing the parts of the piston adjusted to a position which will permit a given percentage of fluid to flow from one side of the piston to the other.

Figure 4 is a view similar to Figure 3 showing the parts of the piston adjusted to a position which will permit a lesser percentage of fluid to flow from one side of the piston to the other.

Figure 5 is a perspective view showing the connection between the piston rod of our device and a scale beam.

Referring to Figure 1 of the drawings, we have shown a conventional type of over and under-weight indicating scale, which consists of a base 1, a scale beam 2, weight pans 3 mounted on the respective ends of the scale beam 2, and an indicator 4 that is operable by movement of the scale beam 2 in any well-known manner.

A cylinder 5, that is closed at one end and adapted to receive oil or other liquid, is formed integrally with the base 1 of the scale. A covering 6 is provided for the open end of this cylinder. Disposed within such cylinder 5 is a piston structure which is adapted to operate therein in a manner hereinafter described.

Such piston structure consists of a piston rod 7 which is attached to the beam 2 of the scale in the manner shown in Figure 5. As shown in this figure, a clip 8 and a screw 9, which extends through the clip 8, beam 2, and the upper end of the piston rod 7, is used as the preferred form of attaching means, although any form may be employed. Rigidly mounted on the lower end of the piston rod by means of a cotter key 10 is an annular plate 11 which forms the main body portion of the piston. Slots 12 of arcuate form are provided in the plate 11.

A sleeve 13 is disposed on the piston rod in such a manner as to be freely slidable with relation thereto and, rigidly attached to the bottom of such hollow shaft is an annular plate 14 having slots 15 of arcuate form provided therein. The plates 11 and 14 and the slots 12 and 15 are complemental to each other when in the cooperative relation best shown in Figure 2. Another annular plate 16 is rigidly attached to the hollow shaft 13 and is disposed immediately above the annular plate 14. A space is provided between the plates 14 and 16, as shown in Figures 1 and 2.

Disposed in a circumferential groove in the top of the hollow shaft 13 is one end of a bent spring 17. The opposite end of this bent spring is preferably disposed around the piston rod 7 and normally bears against a flattened-out portion 18 of the piston rod. The spring 17 is freely rotatable with relation to the piston rod 7, while the sleeve 13 and the spring 17 are not rotatable with relation to each other.

In the operation of our device, when a weight of any description is placed on one of the scale pans 3, the scale beam 2 will be oscillated in one direction or the other and the scale pointer 4 will be moved to one side or the other, depending upon which pan receives the weight. If the end of the scale beam 3, to which the piston rod 7 is attached, is moved downwardly, the annular plate 11 which fits, preferably snugly, within the cylinder 5 will also move downwardly. In this event, the oil or other liquid which is placed within the cylinder 5 will have pressure exerted thereon, whereupon it will force its way through the slots 12 and 15 to the upper side of the piston. The annular plate 16 acts as a splash plate to prevent the oil or other liquid from splashing out of the top of the cylinder.

It will be apparent that, since a relatively large amount of oil or other liquid must pass through the relatively small openings in the annular plates 11 and 14, the downward movement of the annular plate 11 will be materially retarded. By varying the size of the openings through the annular plates 11 and 14, the rate at which the oil or other liquid may pass from one side of the plates to the other may be controlled and thereby the rate at which the plates move upwardly or downwardly may be regulated.

As hereinbefore stated, the sleeve 13 is slidable with relation to the piston rod 7 and the annular plate 14 is rigidly mounted on the lower end thereof. The piston rod 7 is held against rotation by the connection shown in Figure 5 and has rigidly mounted on the lower end thereof the annular plate 11. Also, as hereinbefore stated, one end of the spring 17 is rotatably mounted on the piston rod 7, although it is longitudinally immovable thereon, and the other end of the spring is rigidly attached to the upper end of the sleeve 13.

When it is desired to vary the rate at which the oil or other liquid may flow from one side of the plates 11 and 14 to the other side of the plates, it is only necessary to rotate the plate 14 relative to the plate 11 by using the spring 17 as a handle. Such handle will indicate by its position, the position of the plates relative to each other. Rotation of the annular plate 14 relative to the annular plate 11 will move the slots 15 in the plate 14 with relation with the slots 10 in the plate 11 to vary the size of the openings through which the oil or other liquid may flow from one side of the plates to the other. The spring 17 will maintain the plates 11 and 14 in cooperative relation with each other, as will be seen in Figure 2.

It will also be apparent that a dash pot constructed in accordance with our invention will be equally effective under all conditions for minimizing the oscillations or vibrations of the scale parts after they have been set in motion. This is due to the fact that we have provided a means for adjustment which enables us to obtain substantially the same speed of movement of the scale parts regardless of the weight to be placed on either pan. For instance, if a light weight is to be placed on either weight pan, the plate 14 is revolved relative to the plate 11 until the slots in the respective plates completely coincide. With the plates in this position, the oil or other fluid may more readily flow from one side of the plates to the other. In the event that a heavy weight is to be placed upon the pan, the plate 14 is rotated relatively to the plate 11 to a position wherein the openings through the plates are smaller. With the plates in this position, the flow of oil or other fluid from one side of the plates to the other will be retarded, with the result that the movement of the scale beam will be much slower. Furthermore, since the rate of movement of the scale beam may be regulated, the rate of movement of the indicator 4 across the weighing chart may be controlled. This is advantageous where, for instance, very slight differences in weight are to be indicated.

Having thus described our invention, what we claim is:

1. In a weighing scale, the combination of a dash pot, elements adjustable with relation to each other for varying the effectiveness of said dash pot, a resilient means for maintaining said elements in proper relation, said resilient means being of such structure and so located as to visibly indicate the position of adjustment of said elements.

2. In a weighing scale, the combination of a dash pot, elements rotatable with relation to each other for varying the effectiveness of said dash pot, a handle for effecting relative rotation of such elements, said handle being of a resilient structure and so connected to said elements as to maintain them resiliently in proper relation to each other.

3. In a weighing scale, the combination of a dash pot, elements rotatable with relation to each other for varying the effectiveness of said dash pot, a handle for effecting relative rotation of said elements, said handle being of a resilient structure and so connected to said elements as to maintain them resiliently in proper relation to each other and being so located as to visibly indicate the position of adjustment of said elements.

4. In a weighing scale, the combination of a dash pot, elements adjustable with relation to each other for varying the effectiveness of said dash pot, and a resilient means for adjusting said elements, said means being of such a structure and so located as to visibly indicate the position of adjustment of said elements.

In testimony whereof we hereby affix our signatures.

MERVIL HALLEAD.
THOMAS B. FLANAGAN.